United States Patent
Shen et al.

(10) Patent No.: US 10,616,104 B2
(45) Date of Patent: Apr. 7, 2020

(54) FORWARDING ELEMENT IMPLEMENTATION FOR CONTAINERS

(71) Applicant: Nicira, Inc., Palo Alto, CA (US)

(72) Inventors: Jianjun Shen, Redwood City, CA (US); Donghai Han, Beijing (CN); Vadim Egorov, Palo Alto, CA (US); Corentin Derbois, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 16/112,689

(22) Filed: Aug. 25, 2018

(65) Prior Publication Data
US 2019/0014039 A1    Jan. 10, 2019

Related U.S. Application Data

(63) Continuation of application No. 14/972,000, filed on Dec. 16, 2015, now Pat. No. 10,063,469.

(51) Int. Cl.
*H04L 12/761* (2013.01)
*H04L 12/713* (2013.01)
(Continued)

(52) U.S. Cl.
CPC ........ *H04L 45/586* (2013.01); *G06F 9/45558* (2013.01); *H04L 41/0806* (2013.01);
(Continued)

(58) Field of Classification Search
CPC ... H04L 45/586; H04L 41/0806; H04L 45/16; H04L 41/0893; G06F 9/45558;
(Continued)

(56) References Cited

U.S. PATENT DOCUMENTS

| 7,555,562 | B2 | 6/2009 | See et al. |
| 7,983,265 | B1 | 7/2011 | Dropps |

(Continued)

FOREIGN PATENT DOCUMENTS

| EP | 3298487 A1 | 3/2018 |
| WO | 2016187168 A1 | 11/2016 |

OTHER PUBLICATIONS

Burtsev, Anton, et al., "Fido: Fast Inter-Virtual-Machine Communication for Enterprise Appliances," USENIX'09, Jun. 14-19, 2009, 14 pages, San Diego, California, USA.

(Continued)

*Primary Examiner* — Moo Jeong
(74) *Attorney, Agent, or Firm* — Adeli LLP

(57) ABSTRACT

A method of creating containers in a physical host that includes a managed forwarding element (MFE) configured to forward packets to and from a set of data compute nodes (DCNs) hosted by the physical host. The method creates a container DCN in the host. The container DCN includes a virtual network interface card (VNIC) configured to exchange packets with the MFE. The method creates a plurality of containers in the container DCN. The method, for each container in the container DCN, creates a corresponding port on the MFE. The method sends packets addressed to each of the plurality of containers from the corresponding MFE port to the VNIC of the container DCN.

18 Claims, 15 Drawing Sheets

(51) Int. Cl.
*H04L 12/24* (2006.01)
*G06F 9/455* (2018.01)

(52) U.S. Cl.
CPC .......... *H04L 41/0893* (2013.01); *H04L 45/16* (2013.01); *G06F 2009/45562* (2013.01); *G06F 2009/45566* (2013.01); *G06F 2009/45595* (2013.01)

(58) Field of Classification Search
CPC . G06F 2009/45566; G06F 2009/45595; G06F 2009/45562
See application file for complete search history.

(56) References Cited

U.S. PATENT DOCUMENTS

| | | | |
|---|---|---|---|
| 8,577,845 B2 | 11/2013 | Nguyen et al. | |
| 8,725,898 B1 | 5/2014 | Vincent | |
| 8,863,129 B2 | 10/2014 | Dawson et al. | |
| 9,197,529 B2 | 11/2015 | Ganichev et al. | |
| 9,225,597 B2 | 12/2015 | Tubaltsev et al. | |
| 9,313,129 B2 | 4/2016 | Ganichev et al. | |
| 9,344,349 B2 | 5/2016 | Ganichev et al. | |
| 9,419,855 B2 | 8/2016 | Ganichev et al. | |
| 9,450,873 B2 | 9/2016 | Greenberg et al. | |
| 9,503,371 B2 | 11/2016 | Thakkar et al. | |
| 9,558,029 B2 | 1/2017 | Behera et al. | |
| 9,577,845 B2 | 2/2017 | Thakkar et al. | |
| 9,590,901 B2 | 3/2017 | Tubaltsev et al. | |
| 9,606,896 B2 | 3/2017 | Mehta et al. | |
| 9,645,835 B2 | 5/2017 | Phillips et al. | |
| 9,692,696 B2 | 6/2017 | DeCusatis et al. | |
| 9,697,033 B2 | 7/2017 | Koponen et al. | |
| 9,755,965 B1 | 9/2017 | Yadav et al. | |
| 9,781,009 B2 | 10/2017 | Mehra et al. | |
| 9,785,455 B2 | 10/2017 | Chandrashekhar et al. | |
| 9,819,581 B2 | 11/2017 | Chanda et al. | |
| 9,847,938 B2 | 12/2017 | Chanda et al. | |
| 9,860,151 B2 | 1/2018 | Ganichev et al. | |
| 9,860,342 B2 | 1/2018 | Hunt | |
| 9,893,988 B2 | 2/2018 | Agarwal et al. | |
| 9,898,317 B2 | 2/2018 | Nakil et al. | |
| 9,910,686 B2 | 3/2018 | Chandrashekhar et al. | |
| 9,930,010 B2 | 3/2018 | Sun et al. | |
| 9,971,624 B2 | 5/2018 | Behera et al. | |
| 9,998,371 B2 | 6/2018 | Shen et al. | |
| 10,063,469 B2 | 8/2018 | Shen et al. | |
| 10,078,526 B2 | 9/2018 | Han | |
| 10,078,527 B2 | 9/2018 | Han | |
| 2004/0039741 A1 | 2/2004 | Benson et al. | |
| 2005/0018665 A1 | 1/2005 | Jordan et al. | |
| 2005/0022018 A1 | 1/2005 | Szor | |
| 2006/0143300 A1 | 6/2006 | See et al. | |
| 2006/0200696 A1 | 9/2006 | Shimada | |
| 2007/0094730 A1 | 4/2007 | Bhikkaji et al. | |
| 2007/0140263 A1 | 6/2007 | Mitome et al. | |
| 2008/0175383 A1 | 7/2008 | Sun | |
| 2008/0222309 A1 | 9/2008 | Shanbhogue | |
| 2008/0240122 A1 | 10/2008 | Richardson et al. | |
| 2009/0044276 A1 | 2/2009 | Abdel-Aziz et al. | |
| 2009/0083445 A1 | 3/2009 | Ganga | |
| 2009/0183173 A1 | 7/2009 | Becker et al. | |
| 2009/0254990 A1 | 10/2009 | McGee | |
| 2009/0260083 A1 | 10/2009 | Szeto et al. | |
| 2009/0328220 A1 | 12/2009 | Abdel-Aziz et al. | |
| 2010/0050258 A1 | 2/2010 | Talpade et al. | |
| 2010/0061245 A1 | 3/2010 | Larsen | |
| 2010/0138919 A1 | 6/2010 | Peng et al. | |
| 2010/0172453 A1 | 7/2010 | Cankaya et al. | |
| 2011/0194563 A1 | 8/2011 | Shen et al. | |
| 2012/0170585 A1 | 7/2012 | Mehra et al. | |
| 2012/0179776 A1 | 7/2012 | Umezuki | |
| 2012/0221955 A1 | 8/2012 | Raleigh et al. | |
| 2012/0304168 A1* | 11/2012 | Raj Seeniraj | G06F 9/452 718/1 |
| 2013/0003538 A1 | 1/2013 | Greenberg et al. | |
| 2013/0034094 A1 | 2/2013 | Cardona et al. | |
| 2013/0058335 A1 | 3/2013 | Koponen et al. | |
| 2013/0061047 A1 | 3/2013 | Sridharan et al. | |
| 2013/0142048 A1 | 6/2013 | Gross et al. | |
| 2013/0219078 A1 | 8/2013 | Padmanabhan et al. | |
| 2013/0263118 A1 | 10/2013 | Kannan et al. | |
| 2014/0007087 A1 | 1/2014 | Scott-Nash et al. | |
| 2014/0156818 A1 | 6/2014 | Hunt | |
| 2014/0189867 A1 | 7/2014 | Jung et al. | |
| 2014/0348161 A1 | 11/2014 | Koponen et al. | |
| 2015/0009995 A1 | 1/2015 | Gross et al. | |
| 2015/0016286 A1 | 1/2015 | Ganichev et al. | |
| 2015/0016287 A1 | 1/2015 | Ganichev et al. | |
| 2015/0063364 A1 | 3/2015 | Thakkar et al. | |
| 2015/0263899 A1 | 9/2015 | Tubaltsev et al. | |
| 2015/0263946 A1 | 9/2015 | Tubaltsev et al. | |
| 2015/0370586 A1 | 12/2015 | Cooper et al. | |
| 2016/0048464 A1 | 2/2016 | Nakajima et al. | |
| 2016/0057014 A1 | 2/2016 | Thakkar et al. | |
| 2016/0094460 A1 | 3/2016 | Shelar et al. | |
| 2016/0191545 A1 | 6/2016 | Nanda et al. | |
| 2016/0335107 A1 | 11/2016 | Behera et al. | |
| 2016/0335129 A1 | 11/2016 | Behera et al. | |
| 2017/0093617 A1 | 3/2017 | Chanda et al. | |
| 2017/0093636 A1 | 3/2017 | Chanda et al. | |
| 2017/0093677 A1* | 3/2017 | Skerry | H04L 43/12 |
| 2017/0123832 A1 | 5/2017 | Han | |
| 2017/0126431 A1 | 5/2017 | Han et al. | |
| 2017/0126493 A1 | 5/2017 | Zhang et al. | |
| 2017/0126559 A1 | 5/2017 | Han et al. | |
| 2017/0126726 A1 | 5/2017 | Han | |
| 2017/0142011 A1 | 5/2017 | Zhang et al. | |
| 2017/0142012 A1 | 5/2017 | Thakkar et al. | |
| 2017/0163532 A1 | 6/2017 | Tubaltsev et al. | |
| 2017/0171144 A1 | 6/2017 | Sagiraju et al. | |
| 2017/0180249 A1 | 6/2017 | Shen et al. | |
| 2017/0180250 A1 | 6/2017 | Shen et al. | |
| 2017/0250912 A1 | 8/2017 | Chu et al. | |
| 2017/0277557 A1 | 9/2017 | Koponen et al. | |
| 2017/0295033 A1 | 10/2017 | Cherian et al. | |
| 2017/0302673 A1 | 10/2017 | Makhervaks et al. | |
| 2017/0339054 A1 | 11/2017 | Yadav et al. | |
| 2017/0366446 A1 | 12/2017 | Davie et al. | |
| 2018/0102959 A1 | 4/2018 | Ganichev et al. | |
| 2018/0239631 A1 | 8/2018 | Behera et al. | |

OTHER PUBLICATIONS

Mahalingam, M., et al., "Virtual eXtensible Local Area Network (VXLAN): A Framework for Overlaying Virtualized Layer 2 over Layer 3 Networks," RFC7348, Aug. 26, 2014, 23 pages.
Non-Published commonly owned U.S. Appl. No. 15/959,252, filed Apr. 22, 2018, 50 pages, Nicira, Inc.
Ren, Yi, et al., "Residency-Aware Virtual Machine Communication Optimization: Design Choices and Techniques," 2013 IEEE Sixth International Conference on Cloud Computing, Jun. 28-Jul. 3, 2013, 8 pages, IEEE, Santa Clara, CA, USA.

* cited by examiner

FORWARDING ELEMENT IMPLEMENTATION FOR CONTAINERS

CLAIM OF BENEFIT TO PRIOR APPLICATION

This application is a continuation application of U.S. patent application Ser. No. 14/972,000, filed Dec. 16, 2015, and now published as U.S. Patent Publication 2017/0180249. U.S. patent application Ser. No. 14/972,000, filed Dec. 16, 2015, now published as U.S. Patent Publication 2017/0180249, is incorporated herein by reference.

BACKGROUND

Containers are now being used as a more efficient alternative to OS-level virtualization. A large proportion of containers run in virtual machines (VMs). Multiple containers in a single VM may have their own IP interfaces, MAC and IP addresses.

Different containers may require different networking policies and services such as firewall, access control lists (ACLs), quality of service (QoS), etc. Furthermore, different containers running on the same VM may belong to different logical networks and subnets. In addition to containers, there can be multiple application instances in a single VM, each with its own IP interface. Utilizing these containers and applications in VMs requires efficient ways to forward traffic, provide network services, and implement network virtualization.

BRIEF SUMMARY

Some embodiments implement a managed forwarding element (MFE) that operates on a host machine. The MFE on a host forwards network traffic (e.g., data messages) to and from the VMs. A host is a physical machine that hosts VMs or other data compute nodes for one or more tenants. A VM is a software implementation of a machine such as a computer.

In some embodiments, some or all host machines include virtualization software (e.g., a hypervisor) for virtualizing physical resources of the host machine. The host MFE, in some embodiments, operates within the virtualization software. Some host machines include one or more VMs that connect to the host MFE, some of which may be container VMs that host a set of containers and/or applications. In some embodiments, a local MFE operates within each container VM in order to forward data messages to and from the containers and applications hosted within the container VM.

A typical implementation of a host MFE includes several ports. Each VM is connected to an MFE port through an associated virtual network interface card (VNIC). Each MFE port has its own forwarding table entry (e.g. MAC table entry). Policies (e.g., QoS, ACL, firewall policies) are associated with an MFE port and the MFE applies the policies to the traffic from/to the port. The MFE also maintains statistics and other runtime state for each port.

In scenarios where there are multiple containers or application instances in a VM, each container or application instance may have its own IP interface, MAC and IP address, and network policies. Different containers or applications in a VM may belong to different logical networks or subnets, while these containers and application instances could share the same VNIC to communicate with applications outside the VM.

In order to support such scenarios, some embodiments provide extensions to the host MFE. These embodiments create a separate MFE port for each of the IP interfaces in a VM that share a VNIC. As a result, one VNIC can be connected to multiple MFE ports instead of a single port. In some embodiments, each MFE port corresponding to an IP interface of a container or application instance has its own MFE forwarding table entries and forwarding policies such as unicast MAC entry, multicast MAC entries, promiscuous mode, etc. Each port is configured with the network service policies (such as ACL, mirroring, Internet protocol flow information export (IPFix), firewall, etc.) for the corresponding container or application instance, and may be added to a logical network. The MFE maintains traffic statistics and other runtime state for each port.

Some embodiments do not require changes to the MFE implementation, including forwarding, policy configuration, and individual features (e.g., QoS, ACL, firewall, IPFix, mirroring, spoof guard, routing). Instead, these embodiments provide an extra component (such as a controller) to manage the lifecycle of the MFE ports for containers and applications in a VM. This component creates an MFE port when a new IP interface is connected in the VM. The forwarding table entries are then added and policies are configured for the port using the existing application programming interfaces (APIs). When an IP interface is disconnected or deleted in the VM, the corresponding MFE port is deleted. Creation, deletion, and configuration of MFE ports are controlled in some embodiments by an orchestration layer managed by a local controller in the host.

Creation of containers, applications, and their IP interfaces inside the guest in some embodiments is performed by a container and application controller. In some embodiments, the functionality of the container and application controller is provided by a container orchestration or scheduling solution such as a container cluster management application. In other embodiments, the functionality of the container and application controller is performed by a command line interface (CLI) and/or an API, which is utilized for container creation and deployment. The container and application controller in some embodiments is a separate controller that operates outside the hosts. In some embodiments, the functionality of container and application controller is integrated in the compute manager of a data center. Yet in other embodiments, the container and application controller operates inside each individual host.

When a VM is powered off, all host MFE ports for containers and applications in the VM are disconnected from the MFE. When a VM migrates to another host, the MFE ports are created and connected on the destination host MFE. The forwarding table entries and policies on the ports are copied to the destination host and are reconfigured on the ports. The runtime state of ports that are maintained by the MFE are copied to the destination host and restored to the MFE ports on the destination host.

In some embodiments, each container VM includes a local (or guest) MFE. The local MFE (operating inside the container VM) tags and sends traffic from a local container or application to the host MFE. The host MFE identifies the source container or application from the tag on a packet, performs the forwarding, and applies all networking policies on the traffic.

For an ingress packet from the VNIC, some embodiments perform the following operations. If there is a tag in a packet frame that indicates the packet is from a container or application IP interface, the tag is removed from the packet and the source IP interface is recognized from the tag. The packet is dispatched to the corresponding MFE port. The packet goes through all ingress forwarding stages on the port, each stage applies some policies or services configured on the port. The packet is then forwarded by MFE to a destination port, which could be an uplink port (connected to a physical NIC) if the packet should be forwarded to another host.

For an egress packet to an IP interface in a container VM, some embodiments perform the following operations. The packet is forwarded by MFE to the corresponding MFE port of the IP interface based on the port's forwarding table entry in the MFE forwarding table. The packet goes though all egress forwarding stages on the port, where each stage applies some policies or services configured on the port. The packet is the sent to the container VM VNIC after the tag corresponding to the IP interface is inserted to the frame.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments create a separate MFE port for each of the IP interfaces in a container VM. As a result, one VNIC can be connected to multiple MFE ports instead of a single MFE port. In some embodiments, each MFE port corresponding to an IP interface of a container or application instance has its own MFE forwarding table entries and policies such as unicast MAC entry, multicast MAC entries, promiscuous mode, etc. Each port is configured with the networking policies for the corresponding container or application instance, and may be added to a logical network. The MFE maintains traffic statistics and other runtime state for each port.

I. Creating Multiple Ports on a Host MFE for a Single VNIC

Figure 1:
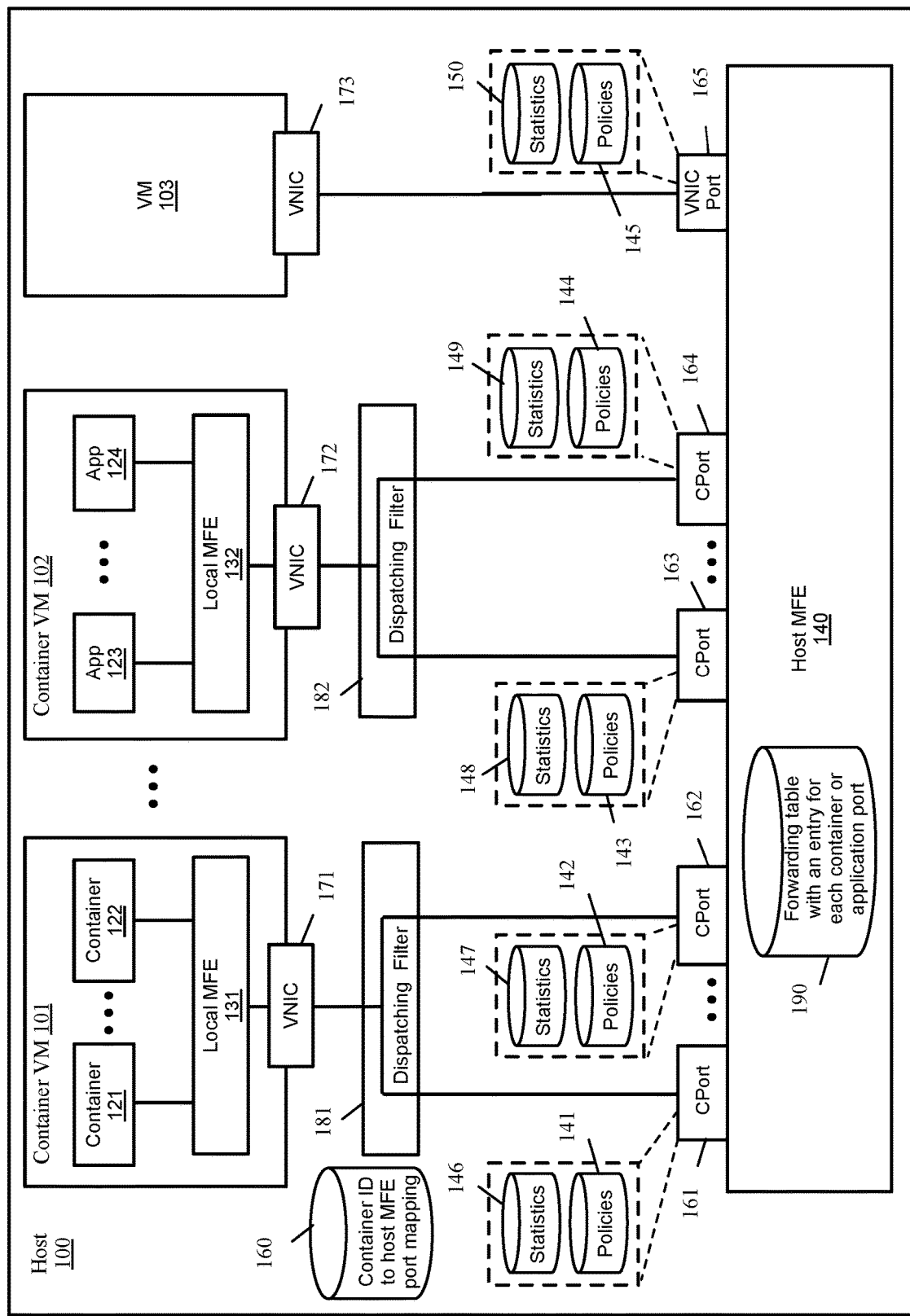
FIG. 1 conceptually illustrates a host that hosts several VMs in some embodiments.

FIG. 1 conceptually illustrates a host that hosts several VMs 101-103 in some embodiments. As shown, VMs 101-102 that are hosted by host 100 are container VMs. Each container VM includes one or more containers 121-122 and/or one or more applications 123-124.

Each container 121-122 or application 123-124 instance in a VM may have its own IP interface, MAC and IP address, and network policies. Different containers or applications in a VM may belong to the same or to different logical networks or subnets. The containers and application instances in a container VM 101 or 102 share a VNIC 171 or 172 to communicate with entities outside the VM.

The host 100 also includes an MFE 140 that operates as a software forwarding element. The MFE performs packet processing operations such as receiving and forwarding packets for the VMs or other data compute nodes that serve as the sources and destinations for packets. For example, the host machine can host VMs for several different logical networks or a container VM can include containers or applications for several different logical networks, and the MFE can implement the several logical networks for the VMs residing on the host. As shown, each VM 101-103 communicates with the MFE 140 through an associated virtual network interface controller (VNIC) 171-173.

In some embodiments the MFE implements an overlay network. An overlay network is a network virtualization technology that achieves multi-tenancy in a computing environment. Examples of overlay networks include Virtual eXtensible LAN (VXLAN), Generic Network Virtualization Encapsulation (GENEVE), and Network Virtualization using Generic Routing Encapsulation (NVGRE). For instance, VXLAN is a layer 2 (L2) overlay scheme over a Layer 3 (L3) network. VXLAN encapsulates an Ethernet L2 frame in IP (MAC-in-UDP encapsulation) and allows VMs to be a part of virtualized L2 subnets operating in separate physical L3 networks. Similarly, NVGRE uses Generic Routing Encapsulation (GRE) to tunnel L2 packets over L3 networks.

Some embodiments create a separate MFE port for each of the IP interfaces in a VM that share a VNIC. As a result, one VNIC can be connected to multiple MFE ports instead of a single port. As shown, each container 121-122 has a corresponding port 161-162 on the host MFE 140. Similarly, each application 123-124 has a corresponding port 163-164 on the host MFE 140. VNICs 171-172 are therefore connected to multiple ports on the host MFE. In contrast, VM 103 is not a container VM and VNIC 173 is connected to only one port 165 on the host MFE.

In some embodiments, each MFE port 161-164 of an IP interface (of a container 121-122 or application 123-124 instance in a VM) has its own MFE forwarding table entries in the host MFE forwarding table 190. Each MFE port 161-164 of an IP interface also has its own policies 141-144 such as unicast MAC entry, multicast MAC entries, promiscuous mode, etc. Each port is configured with the networking policies for the corresponding container or application instance, and may be added to a logical network. The MFE maintains traffic statistics and other runtime state 146-149 for each port. Each port that corresponds to the VNIC of a non-container VM (e.g., port 103) also has an entry in the host MFE forwarding table 190 as well as its own policies 145 and statistics 150.

In order to attach containers (or applications) to a particular port of the host MFE, a local MFE 131-132 in each container VM 101-102 maintains container (or application) information such as address information (e.g., MAC address, IP address, virtual local area network identifier (VLAN ID), etc.) as well as application state data for applications running in the container. The local MFE tags packets that are sent from each container or application to the host MFE with the container or application information (e.g., VLAN ID).

Some embodiments provide a dispatching filter 181-182 for each VNIC 171-172. The dispatching filter intercepts packets sent by the VNIC to the host MFE. For instance, the filter intercepts packets that a VM sends to an MFE port created for a container or an application. The filter determines the identification of the container or application based on the tag information, determines the corresponding port on the host MFE from the mapping table 160, removes the tag from each packet, and forwards the packet to the determined port.

Although FIG. 1 and other examples in the following sections describe a dispatching filter for tagging and un-tagging of packets, it should be understood that other techniques for tagging and un-tagging of packets could be used. For instance, the MFE in some embodiments is a flow-based MFE. A flow-based MFE operates by matching incoming packets with one or more flow entries. Each flow entry includes a set of matching criteria (or condition) and a set of actions. The matching criteria specify a subset of the packet header values for which it requires a match. When a packet matches the set of matching criteria of a flow entry, the action or actions specified by the corresponding set of actions are performed on the packet.

In these embodiments, the tagging and un-tagging of packets are done using the match action operations. When a match criteria determines that a packet is received from a container or application, the corresponding action un-tags the packet and forwards the packet to the corresponding MFE port. Similarly, when a packet is sent from the MFE to a container or application, the match criteria determines the MFE port that corresponds to the container or application. The corresponding action then tags the packet with the ID of the container or application. In other words, the dispatching filter in these embodiments is implemented inside the host MFE as a set of match actions that tags and un-tags the packets and dispatches the packet to/from the host MFE ports.

A. Creating a Container or Application on a Container VM

Figure 2:
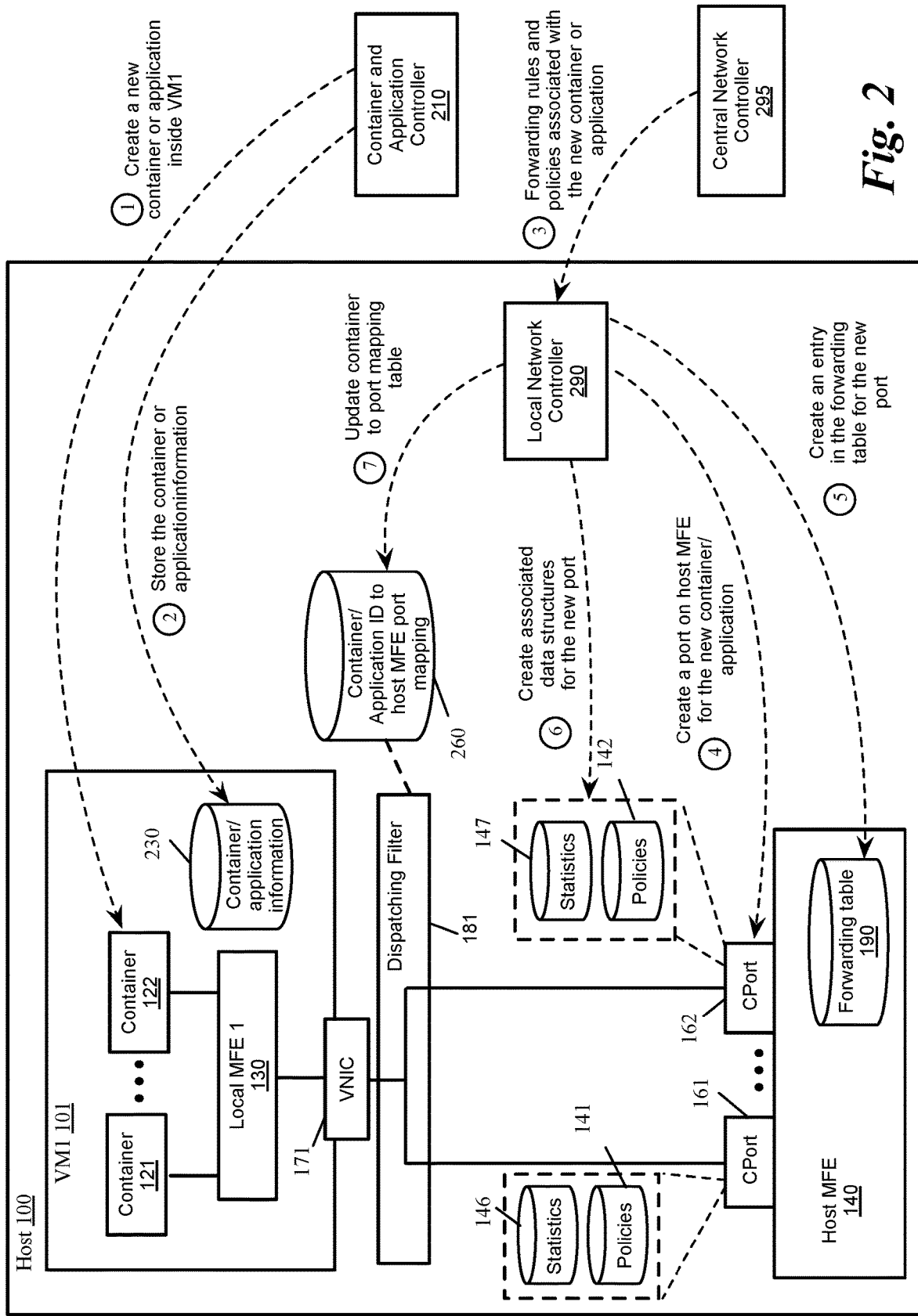
FIG. 2 conceptually illustrates creating a container or application in a container VM and generating an associated port on the host MFE in some embodiments.

FIG. 2 conceptually illustrates creating a container or application in a container VM and generating an associated port for the container or application on the host MFE in some embodiments. Creation of containers, applications, and their IP interfaces inside the guest in some embodiments is performed by a container and application controller. In some embodiments, the functionality of the container and application controller is provided by a container orchestration or scheduling solution such as a container cluster management application. In other embodiments the functionality of the container and application controller is performed by a command line interface (CLI) and/or an API, which is utilized for container creation and deployment. The container and application controller in some embodiments is a separate controller that operates outside the hosts as shown in FIG. 2. In some embodiments, the functionality of container and application controller is integrated with the compute manager of the data center. Yet in other embodiments, the container and application controller operates inside each individual host (not shown).

As shown in step 1, container and application controller 210 (e.g., a separate controller or a controller integrated with the compute manager) creates a new container or application in a container VM. The container and application controller also updates the container (or application) information 230 in the container VM as shown in step 2. For instance, each container or application is assigned a unique context such as a VLAN ID. In some embodiments, other information such as the MAC address and the IP address of a container (or application) is also stored in the container/application information storage 230. Although the data structure 230 in FIG. 2 is shown inside the container VM, in some embodiments the data structure is maintained outside the container VM and is accessible by the container VM.

As shown in the figure, several other operations (labeled as steps 4 to 7) are performed by local network controller 290 for creating a port on the host MFE and creating (or updating) different data structures and tables in the host to support the port. The local network controller in different embodiments receives the required information for performing steps 4 to 7 differently. In some embodiments, container and application controller 210 and central network controller 295 receive information required for their respective operations from user interactions (e.g., with a user interface in the management plane) that provide the information for their respective operations. Central network controller 295 then passes the relevant information to local network controller 290 (as shown in step 3) to create the port and the associated data structures.

In other embodiments, this information is received by container and application controller 210, which passes the relevant information for the creation of the port to central network controller 295. Central network controller 295 then passes the relevant information to local network controller 290 (as shown in step 3). Yet in other embodiments, local network controller 290 monitors local MFE 130 and determines that a new container is created and connected to the local MFE. The local network controller 290 then proceeds to perform operations 4 to 7 for the new container by receiving the information from the central network controller 295.

As shown in step 4, a new port 162 is created on the host MFE for the new container or application. Furthermore, as shown in step 5, an entry is created in the forwarding table 190 of the host MFE 140 for the new port 162. For instance, an entry is added in the forwarding table that maps the MAC address of the new container or application to the corresponding port.

Figure 3:
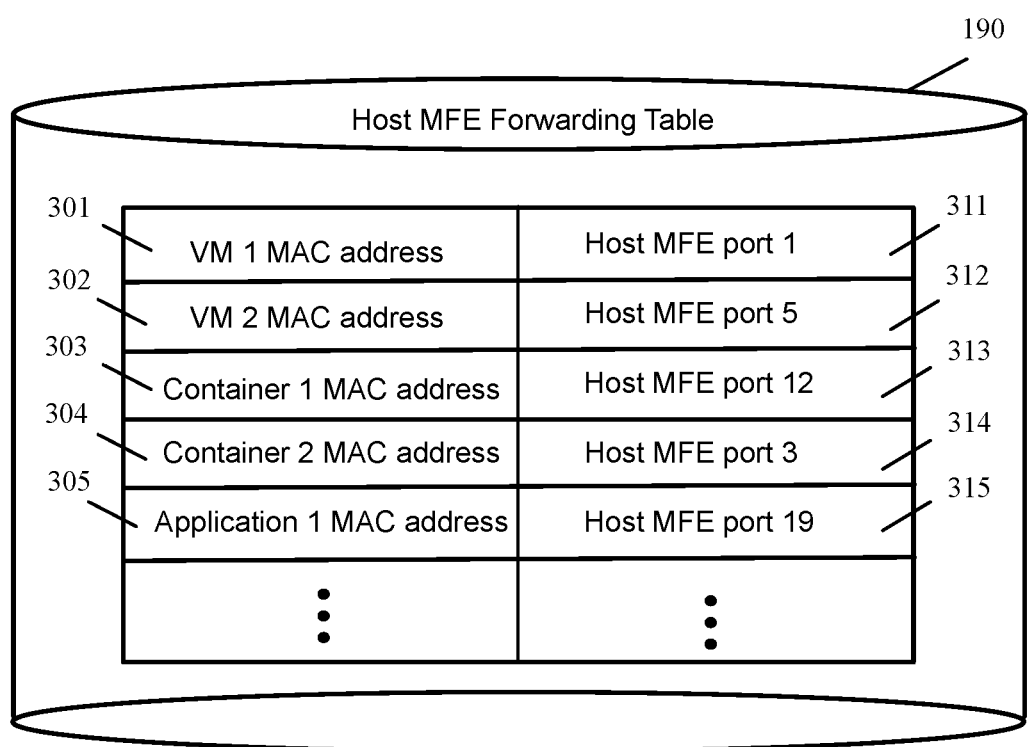
FIG. 3 conceptually illustrates a portion of a forwarding table of a host MFE in some embodiments.

FIG. 3 conceptually illustrates a portion of a forwarding table of a host MFE in some embodiments. As shown, the forwarding table 190 maps the MAC address 301-305 of different entities such as non-container VMs, containers, and applications to a corresponding port 311-315 of the host MFE. In some embodiments, other L2 information such as VLAN ID, VXLAN network identifier (VNI) corresponding to these entities is also included in the forwarding table (not shown).

When a packet is received at the host MFE, the destination MAC address (and other L2 network information such as VLAN ID, VXLAN VNI, etc.) of the packet is extracted from the packet and is used as an index to the forwarding table 190 to determine the corresponding host MFE port. Other forwarding policies such as promiscuous mode are also considered in forwarding decision. The packet is then forwarded to the determined host MFE port.

Referring back to FIG. 2, the associated data structures such as policies table 142 and statistics table 147 for the new port are also created as shown in step 6. The polices include security, firewall, QoS, ACL, IPFix, mirroring, spoof guard, routing, etc. The statistics table is used to collect statistic as well as the current state for the port.

As shown in step 7, some embodiments create an entry for the new port in a mapping table 260 that maps the container or application identification to the corresponding host MFE port as shown in step 8. In some embodiments this mapping table is used by the dispatching filter 181 to dispatch packets between the host MFE and containers and applications hosted in a container VM. For instance, packets sent from the local MFE of a container VM are tagged with the container or application identification. The dispatching filter uses the tag information to identify the container/application ID. The container/application is used to identify the corresponding port of the host MFE from the mapping table 160. Similarly, the dispatching filter intercepts packets from host MFE ports and tags them with the corresponding container or application ID using the information in the mapping table 260.

Figure 4:
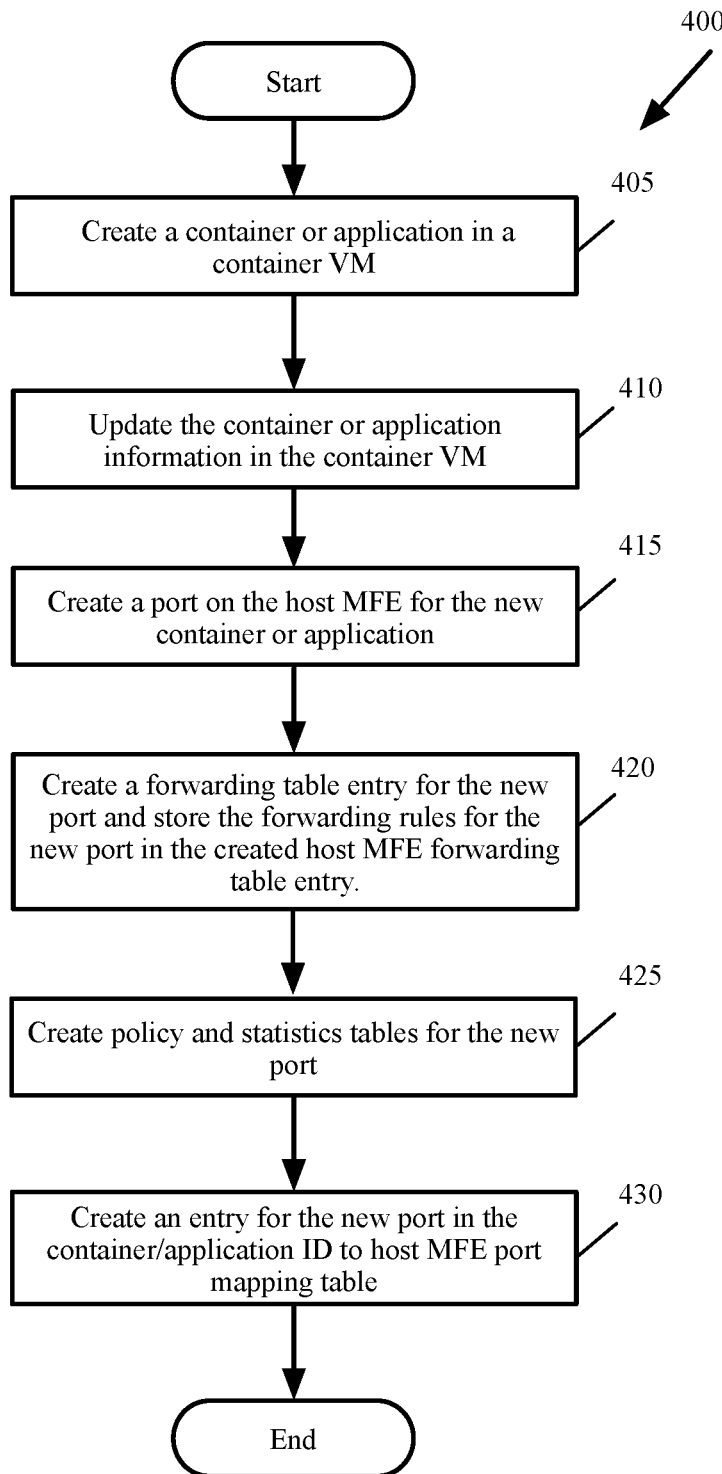
FIG. 4 conceptually illustrates a process for generating a new container or application and the associated data structures in some embodiments.

FIG. 4 conceptually illustrates a process 400 for generating a new container or application and the associated data structures in some embodiments. Operations 405 and 410 of the process are performed in some embodiments by a container and application controller such as container and application controller 210 in FIG. 2, while operations 415-430 are performed by a local network controller such as local network controller 290.

As shown, the process creates (at 405) a container or application in a container VM. For instance, the process creates container 122 shown in step 1 in FIG. 2. The process then updates (at 410) the container (or application) information in the container VM. For instance, the process updates the container (or application) information 230 in the container VM as shown in step 2 in FIG. 2.

The process then creates (at 415) a port on the host MFE for the new container or application. For instance, the process creates port 162 on the host MFE 140 in FIG. 2. The process then creates (at 420) a forwarding table entry for the new port and stores the forwarding rules for the new port in the host MFE forwarding table entry. For instance, the process creates an entry in the forwarding table 190 as shown in FIG. 2 (in step 4) and in FIG. 3.

The process then creates (at 425) the policies and statistics tables for the new port. For instance, the process creates the policies table 142 and statistics table 147 as shown in step 5 in FIG. 2. The process then optionally creates (at 430) an entry for the new port in the mapping table that maps the container/application ID to the corresponding host MFE port. For instance, the process creates an entry for the new port in the container/application ID to host MFE port mapping table 260 in FIG. 2. The process then ends.

B. Deleting a Container or Application on a Container VM

Figure 5:
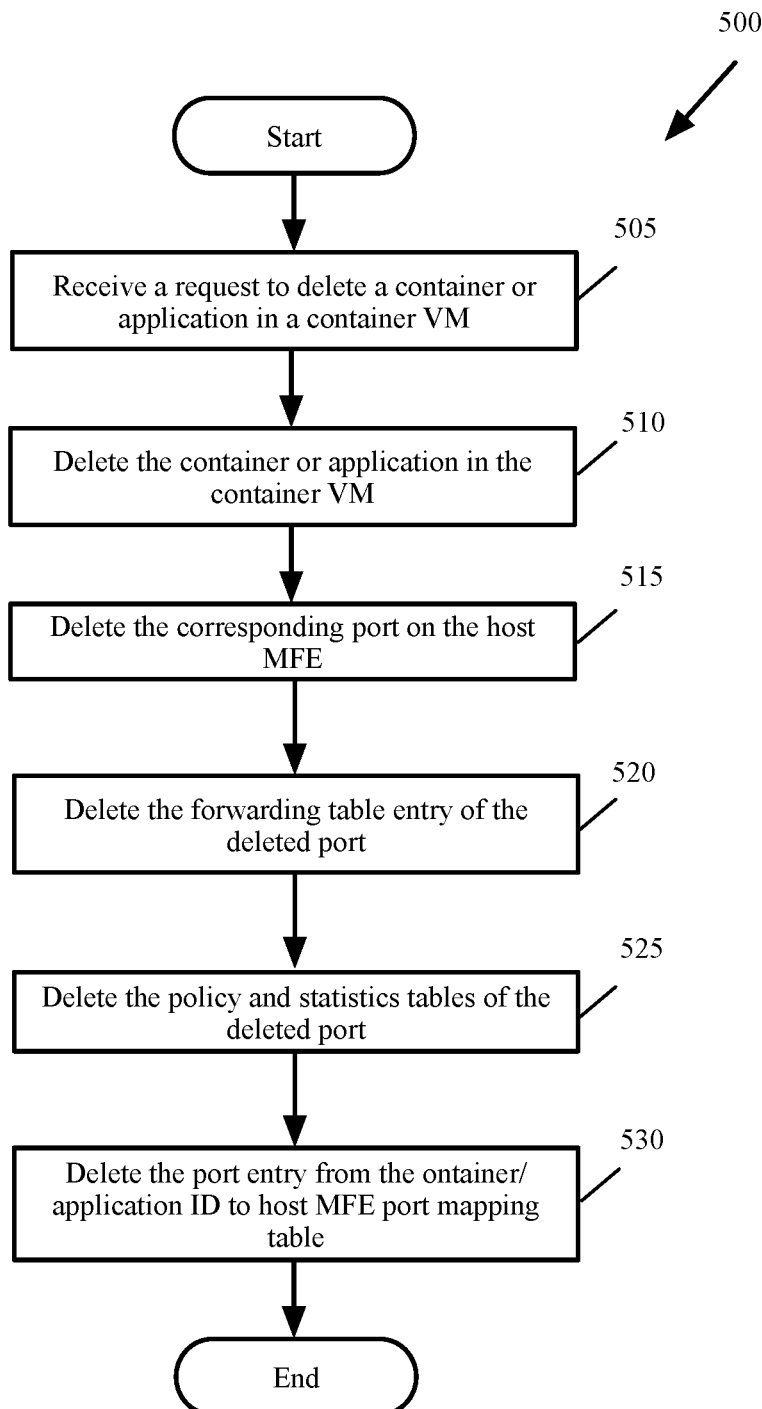
FIG. 5 conceptually illustrates a process for deleting a container or application and the associated data structures in some embodiments.

FIG. 5 conceptually illustrates a process 500 for deleting a container or application and the associated data structures in some embodiments. Operations 505 and 510 of the process is performed in some embodiments by a container and application controller such as container and application controller 210 in FIG. 2, while operations 515-530 are performed by a local network controller such as local network controller 290.

As shown, the process receives (at 505) a request to delete a container or application in a container VM. For instance, the process receives a request to delete container 122 in FIG. 2. Next, the process deletes (at 510) the requested container or application from the container VM. For instance, the process deletes container 122 in FIG. 2. The process then deletes (at 515) the port on the host MFE that corresponds to the deleted container or application. For instance, the process deletes port 162 on the host MFE 140 in FIG. 2.

The process then deletes (at 520) the forwarding table entry of the deleted port from the host MFE forwarding table entry. The process then deletes (at 525) the policies and statistics tables for the deleted port. For instance, the process deletes the policies table 142 and statistics table 147 in FIG. 2. The process then deletes (at 530) the entry corresponding to the deleted port from the mapping table that maps the container/application ID to the corresponding host MFE port. For instance, the process deletes the entry of the deleted port from the container/application ID to host MFE port mapping table 260 in FIG. 2. The process then ends.

C. Sending Packets from Containers or Applications to the Host MFE

Figure 6:
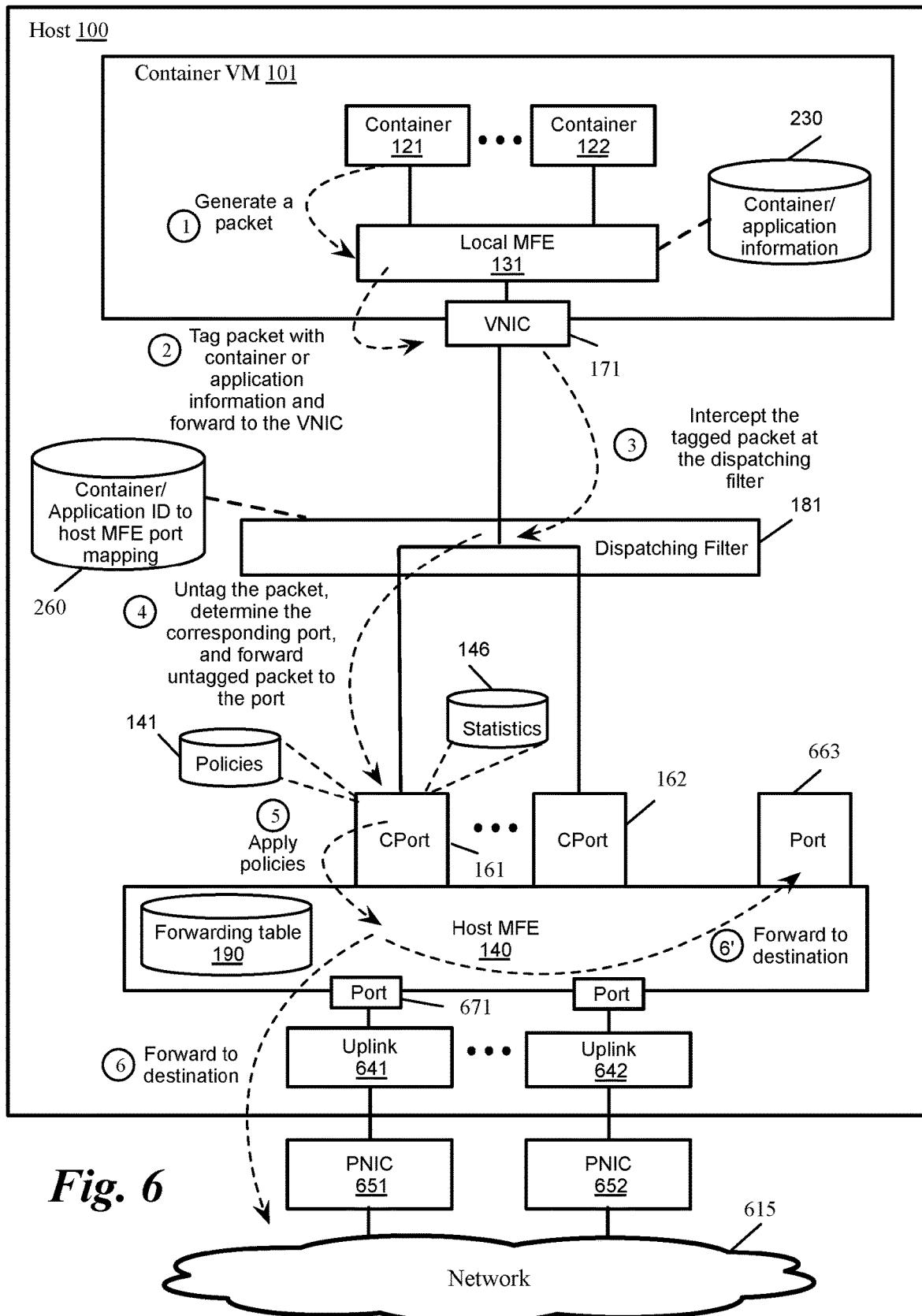
FIG. 6 conceptually illustrates operations performed on a packet sent from a container VM to a host MFE in some embodiments.

FIG. 6 conceptually illustrates operations performed on a packet sent from a container VM to a host MFE in some embodiments. As shown, the local MFE 131 receives a packet generated by a container 121 (or an application) in step 1. In step 2, the local MFE 131 utilizes the container (or application) information 230 and tags the packet with the container (or application) information. For instance, the local MFE tags the packet with the VLAN ID of the container (or application). Tagging the packet in some embodiments includes associating the tag to the packet as packet metadata. In other embodiments, the tag value is inserted in a predetermined field in the packet header. In some alternative embodiments, a local network controller running in the container VM tags the packets in coordination with the local MFE. The tagged packet is then forwarded to the VNIC 171. Details of tagging of a packet by a local controller are described in U.S. patent application Ser. No. 14/839,746, entitled Logical Processing for Containers, now issued as U.S. Pat. No. 9,558,029, contents of which are incorporated herein by reference.

In step 3, the dispatching filter intercepts the tagged packet. For instance, the dispatching filter in some embodiments is configured to listen to and intercept the outbound traffic sent from the VNIC of a container VM to the host MFE. In step 4, the dispatching filter removes the tag from the packet and identifies the container/application that is the source of the packet. The dispatching filter then identifies the port 161 that corresponds to the source container/application. For instance, the dispatching filter uses the mapping table 260 that maps container/application ID to host MFE port to identify the port 161 that corresponds to the container ID of container 121 in mapping table 160.

In step 5, the port 161 on the host MFE that corresponds to the source container/application applies different policies such as security, firewall, ACL, mirroring, IPFIX, QoS, etc., using the policies table 141 corresponding to the port 161. If the host MFE implements an overlay network, the port 161 software also encapsulates the packet with overlay network headers. The port 161 software also collects statistics and the current state of the port and store them in the port's statistics table 146. The packet is then forwarded by host MFE 140 to a destination port.

As shown in step 6, if the packet should be forwarded to another host, the packet is forwarded to an uplink port 671, which is connected to a physical NIC 651 through an uplink 641. An uplink 641-642 is a module that relays packets between the host MFE 140 and a PNIC 651-652 in order to perform various packet processing functions on incoming and outgoing traffic from/to a network 615. Alternatively, if the packet should be forwarded to a container, an application, or a VM inside the host, the packet is forwarded to a port such as port 663 that is connected to the destination container, application, or VM as shown in step 6'.

Figure 7:
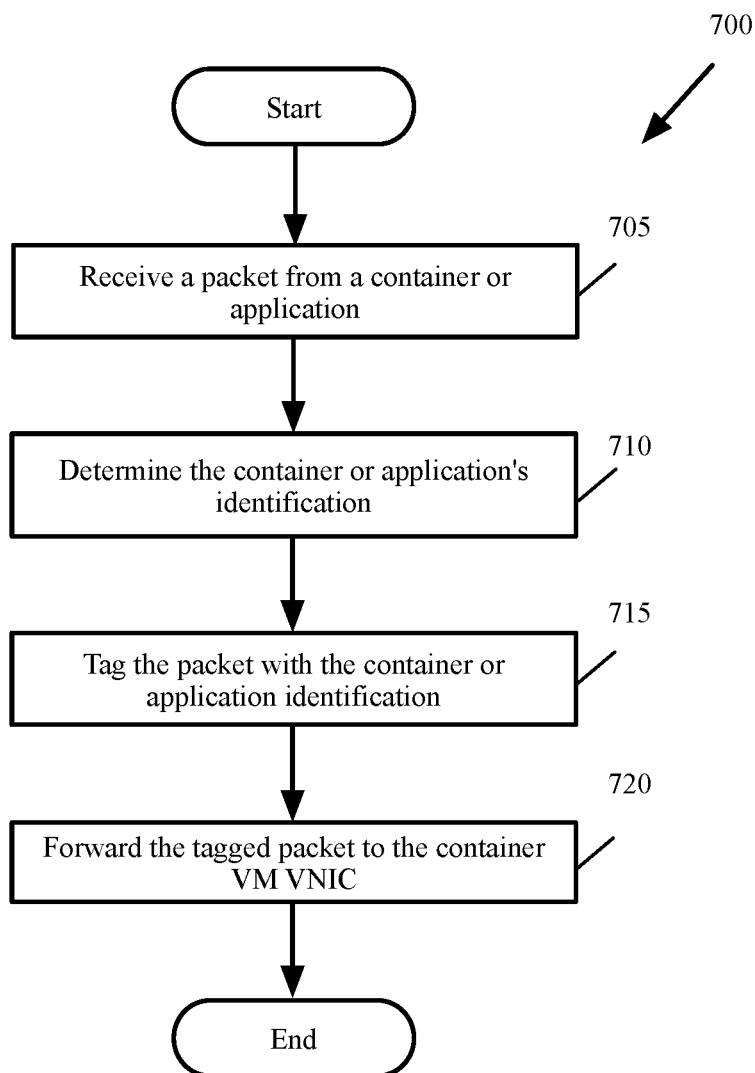
FIG. 7 conceptually illustrates a process for tagging packets generated at container VMs with a container or application identification in some embodiments.

FIG. 7 conceptually illustrates a process 700 for tagging packets generated at container VMs with the container or application identification in some embodiments. The process in some embodiments is performed by a local MFE such as local MFE 131 in FIG. 6. In other embodiments, the process is performed by a local controller running on the container VM.

As shown, the process receives (at 705) a packet from a container or application. For instance, the process receives a packet at local MFE 131 from container 121 as shown in step 1 in FIG. 6. The process then determines (at 710) the container or application's identification. For instance, the process uses the container or application information 230 to identify an identification such as VLAN ID, MAC address, or IP address of the container or application as shown in step 2 in FIG. 6.

The process then tags (at 715) the packet with the identification of the source container or application. For instance, the process tags the packet as shown in step 2 in FIG. 6. Tagging the packet in some embodiments includes associating the tag to the packet as metadata. In other embodiments, the process inserts the tag value in a predetermined field in the packet header.

The process then forwards (at 720) the tagged packet to VNIC of the container VM. For instance, the process forwards the tagged packet to the VNIC 171 as shown in step 6 in FIG. 6. The process then ends.

Figure 8:
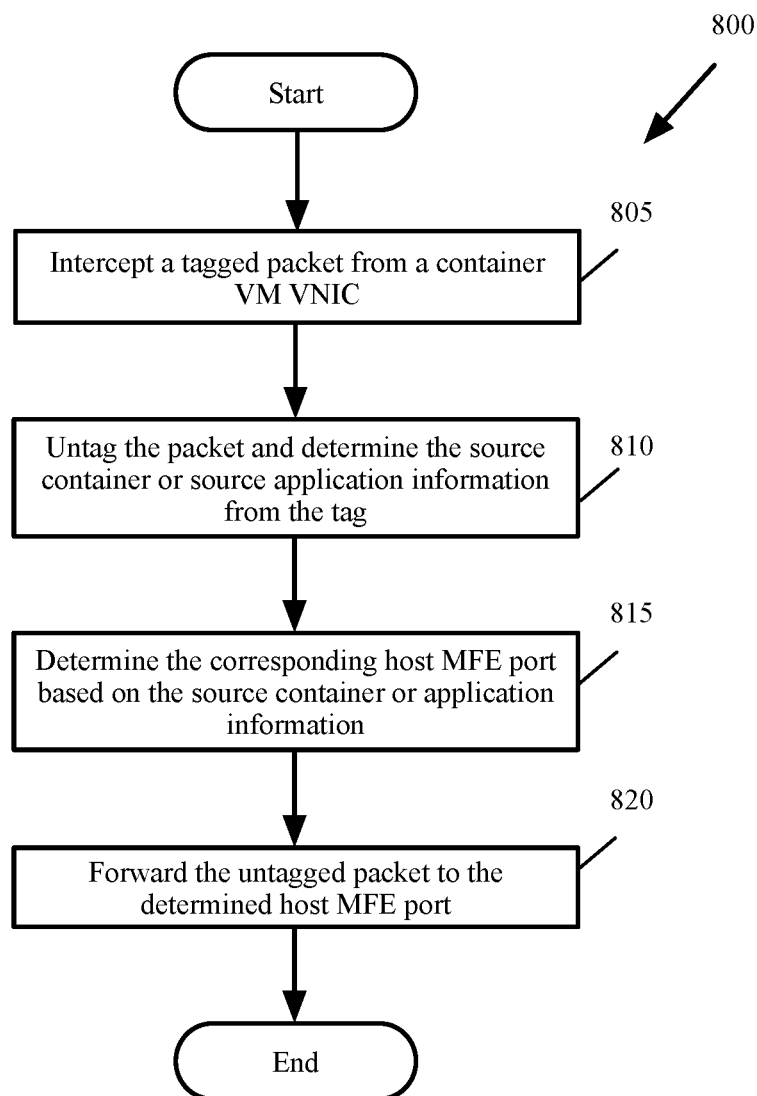
FIG. 8 conceptually illustrates a process for forwarding a packet to a host MFE port based on the tag information associated with the packet in some embodiments.

FIG. 8 conceptually illustrates a process 800 for forwarding a packet to a host MFE port based on the tag information associated with the packet in some embodiments. The process in some embodiments is performed by a dispatching filter such as the dispatching filter 181 in FIG. 6. In other embodiments where the MFE is a flow-based MFE, the process is performed by a set of match and action flows in the host MFE.

As shown, the process intercepts (at 805) a tagged packet sent from the VNIC of a container VM to the host MFE. For instance, the process intercepts a tagged packet at the dispatching filter 181 as shown in step 3 in FIG. 6. In the embodiments that utilize a flow-based MFE, the process identifies a tagged packet in one of the match action flows. The process then un-tags (at 810) the packet and determines the source container (or source application) information from the tag.

The process then determines (at 815) the corresponding host MFE port based on the source container or source application information. For instance, the process determines the host MFE port by the dispatching filter 181 as shown in step 4 in FIG. 6. The process then forwards (at 820) the untagged packet to the determined host MFE port. The process then ends.

Figure 9:
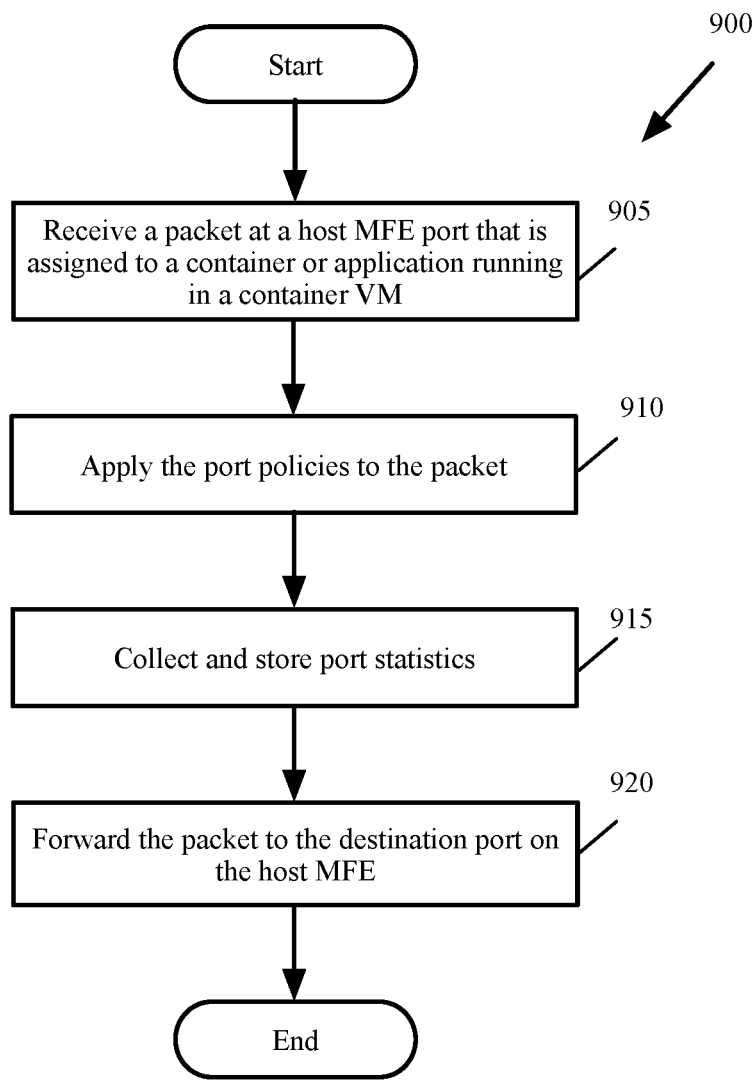
FIG. 9 conceptually illustrates a process for processing of a packet received at a host MFE from a container or application that runs in a container VM in some embodiments.

FIG. 9 conceptually illustrates a process 900 for processing of a packet received at a host MFE from a container or application that runs in a container VM in some embodiments. The process in some embodiment is performed by a host MFE. As shown, the process receives (at 905) a packet at a host MFE port that is assigned to a container or application that is running on a container VM. For instance, the process received an untagged packet from the dispatching filter 181 at port 161 of the host MFE 140, which is assigned to container 121 running in container VM 101 as shown FIG. 6.

The process then utilizes the polices table associated with the host MFE port to apply (at 910) different polices to the packet. For instance, the process utilizes the policies table 141 associated with port 161 to apply policies such as security, firewall, ACL, mirroring, IPFIX, QoS, etc., to the packet as shown in step 5 in FIG. 6.

Next, the process collects (at 915) and stores port statistics. The process then forwards (at 920) the packet to an output port of the host MFE as identified in the packet. For instance, the process forwards the packet to a port such as port 671 or 663 as shown in step 6 or 6' in FIG. 6. The process then ends.

D. Receiving Packets at Containers or Applications from the Host MFE

Figure 10:
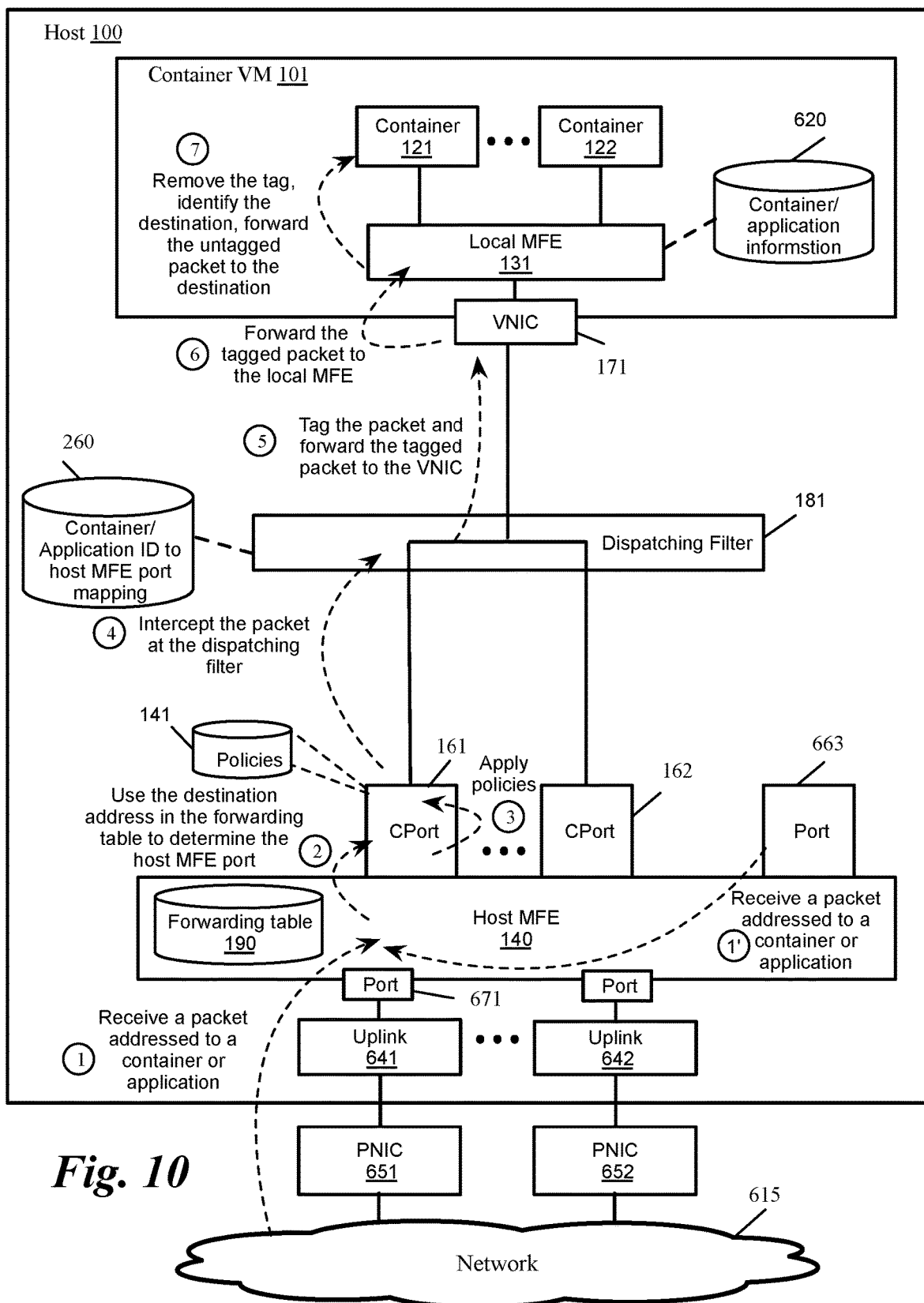
FIG. 10 conceptually illustrates operations performed on a packet that is addressed to a container or application is received at a host MFE in some embodiments.

FIG. 10 conceptually illustrates operations performed on a packet that is addressed to a container or application is received at a host MFE in some embodiments. As shown, in step 1 a packet that is addressed to a container or application is received at the host MFE 140. For instance, the packet is received at PNIC port 671 from a network 615 through a PNIC 651 and uplink 641. Alternatively, the packet is received from an entity such as a container, an application, or a VM from inside the host 100 at a port 663 as shown in step 1'.

The host MFE then utilizes the information in the forwarding table 190 to identify the port 161 that corresponds to the destination container or application as shown in step 2. For instance, the host MFE matches the destination MAC address (and other L2 network information such as VLAN ID, VXLAN VNI, etc.) of the packet to a corresponding port on the host MFE. The port then applies different policies such as security, firewall, ACL, mirroring, IPFIX, QoS, etc., using the policies table 141 corresponding to the port 161 as shown in step 3.

In step 4, the dispatching filter 181 intercepts the packet. For instance, the dispatching filter listens to traffic addressed from the host MFE to the VNIC of a container VM. In step 5, the dispatching filter 181 tags the packet with the identification of the destination container or application and forwards the tagged packet to the container VM 101 VNIC 171. For instance, the dispatching filter uses the information in the mapping table 230 to identify the ID of the destination container/application. Alternatively, in the embodiments that utilize a flow-based MFE, a set of match action flows in the host MFE identify the container/application associated with the packet and tag the packet with the ID of the container/application.

The VNIC forwards the tagged packet to the local MFE 131 as shown in step 6. The local MFE 131 then removes the tag, identifies the destination container or application from the tag information, and forwards the untagged packet to the destination container 121 or destination application as shown in step 7.

Figure 11:
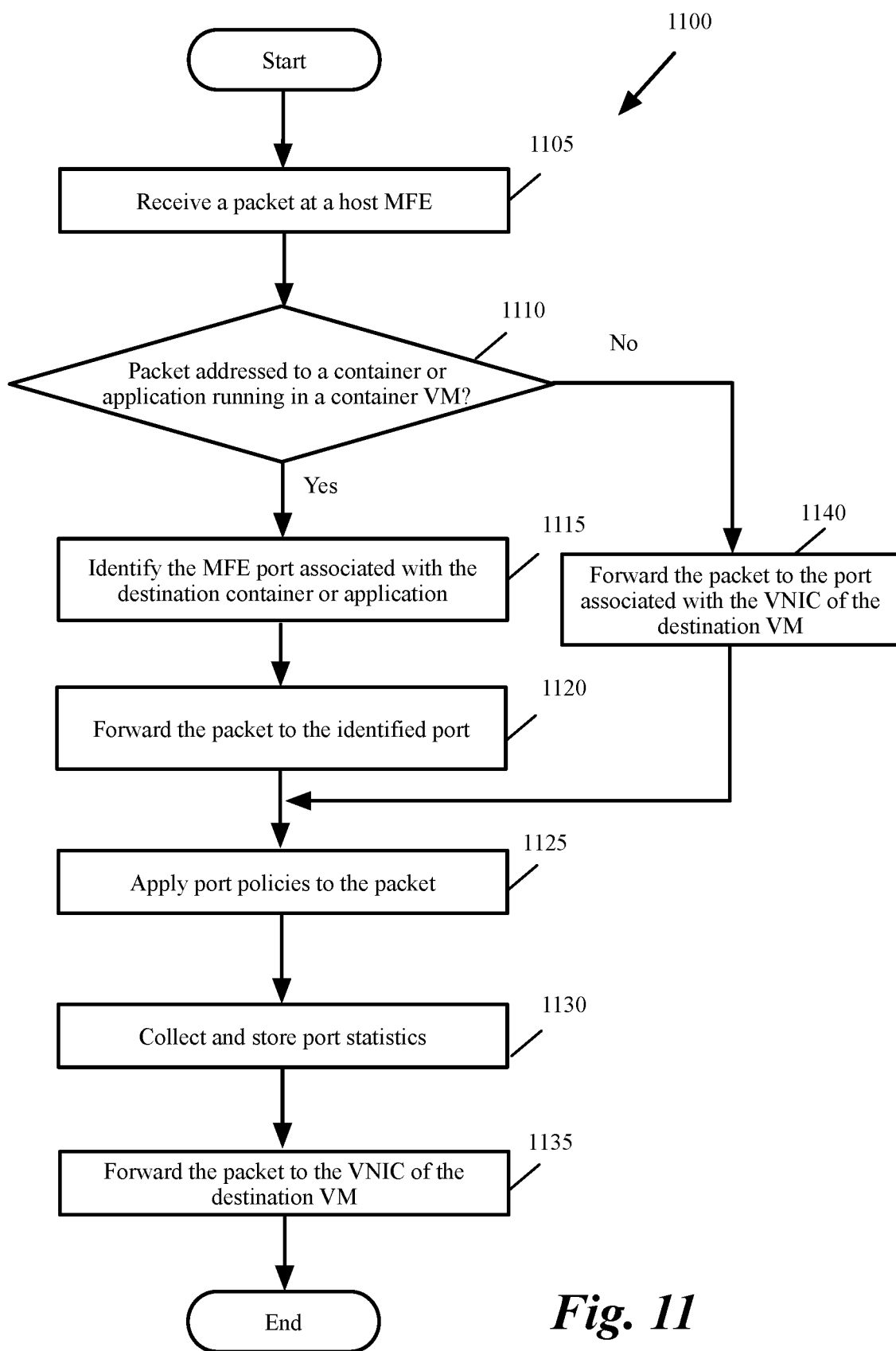
FIG. 11 conceptually illustrates a process of some embodiments for processing a packet that is received at a host MFE and is addressed to a destination container or application in some embodiments.

FIG. 11 conceptually illustrates a process 1100 of some embodiments for processing a packet that is received at a host MFE and is addressed to a destination container or application in some embodiments. The process is performed by a host MFE in some embodiments. As shown, the process receives (at 1105) a packet at the host MFE. For instance the process receives a packet at port 671 from a network 615 as shown in step 1 in FIG. 10 or the process receives a packet at port 663 from an entity inside host 100 as shown in step 1' in FIG. 10.

The process then determines (at 1110) whether the packet is addressed to a container or application that is running in a container VM. For instance, the process utilizes the information in the forwarding table 190 of the host MFE 140 to determine whether the packet is addressed to a container or application inside a container VM or the packet is addressed to a non-container VM.

When the packet is addressed to a non-container VM, the process forwards (at 1140) the packet to the port associated with the VNIC of the destination VM. The process then proceeds to 1125, which is described below. On the other hand, when the packet is addressed to a container or application running in a container VM, the process identifies (at 1115) the MFE port associated with the destination container or application. For instance, the process utilizes the information in the forwarding table 190 of the host MFE 140 to determine the port associated with the destination container or application as shown in step 2 in FIG. 10.

The process then applies (at 1125) the port policies to the packet. For instance the process utilizes the policies table 141 or 145 shown in FIGS. 1 and 6 that is associated with the identified port to apply different polices such as security, firewall, ACL, mirroring, IPFIX, QoS, etc., to the packet.

Next, the process collects (at 1130) and stores port statistics and the current state of the port. For instance, the process collects and stores port statistics and the current state of the port in the statistic table 146 or 150 as shown in FIGS. 1 and 6. The process then forwards (at 1135) the packet to the VNIC of the destination VM. The process then ends.

Figure 12:
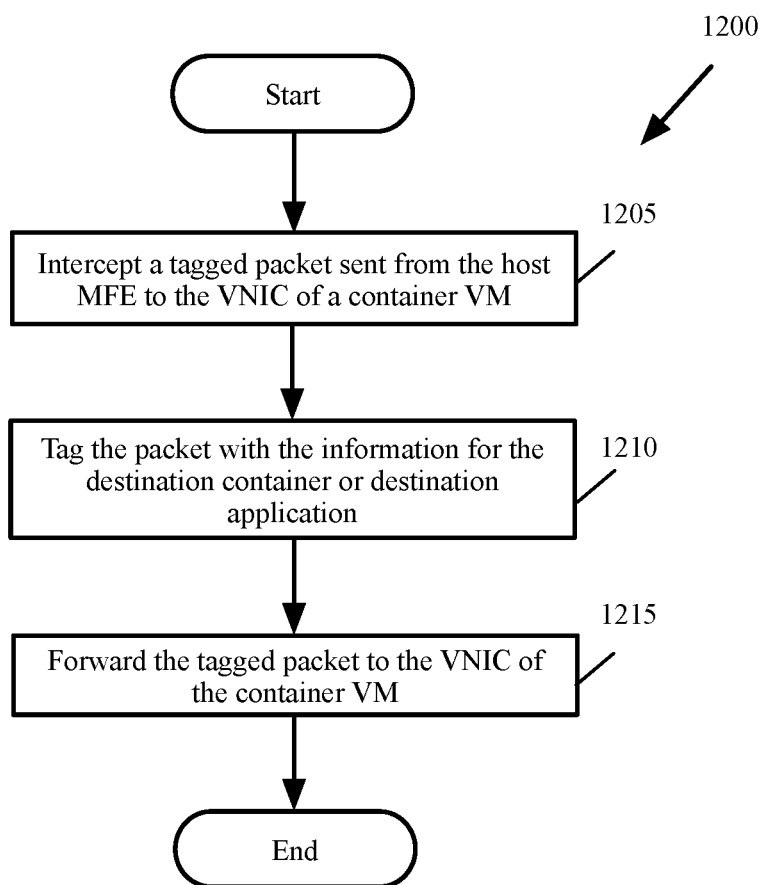
FIG. 12 conceptually illustrates a process of some embodiments for intercepting and tagging a packet that sent from a host MFE to the VNIC of a container VM in some embodiments.

FIG. 12 conceptually illustrates a process 1200 of some embodiments for intercepting and tagging a packet that is sent from a host MFE to the VNIC of a container VM in some embodiments. The process is performed in some embodiments by a dispatching filter such as the dispatching filter 181 shown in FIG. 10. In the embodiments that utilize a flow-based MFE, the process is performed by a set of match action flows in the host MFE.

As shown, the process intercepts (at 1205) a tagged packet that is sent from the host MFE and is addressed to the VNIC of a container VM. For instance, the process intercepts a packet by the dispatching filter 181 as shown in step 4 in FIG. 10. The process then tags (at 1210) the packet with the information for the destination container or destination application. For instance, the process tags the packet as shown in step 5 in FIG. 10.

The process then forwards (at 1215) the tagged packet to the VNIC of the container VM. For instance, the process forwards the packet to VNIC 171 as shown in step 5 of FIG. 10. The process then ends.

Figure 13:
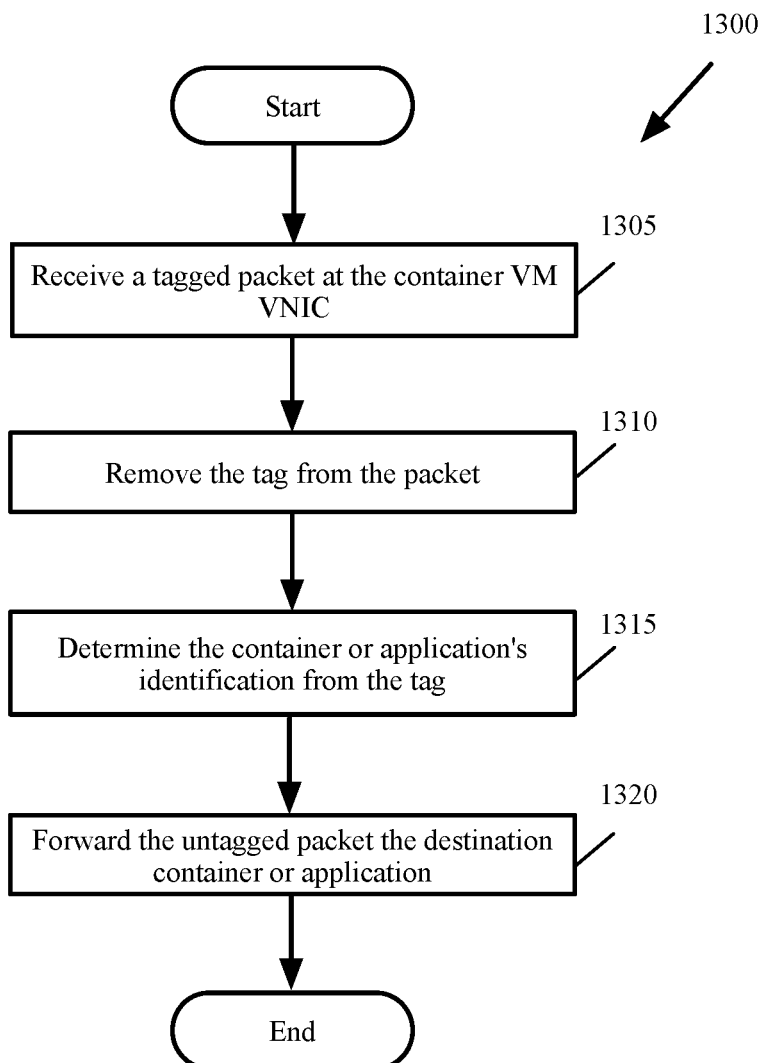
FIG. 13 conceptually illustrates a process of some embodiments for delivering packets to containers or application that run in a container VM in some embodiments.

FIG. 13 conceptually illustrates a process 1300 of some embodiments for delivering packets to containers or application that run in a container VM in some embodiments. The process is performed in some embodiments by local MFE such as the local MFE 131 shown in FIG. 10.

As shown, the process receives (at 1305) a tagged packet from a container VM VNIC. For instance, the process receives a tagged packet at the local MFE 131 from VNIC 171 as shown in step 6 in FIG. 10. The process then removes (at 1310) the tag from the packet.

The process then identifies (at 1315) the destination container or application from the information in the tag. For instance, the process identifies the destination container or application as described in step 7 in FIG. 10. The process then forwards (at 1320) the untagged packet to the destination container or application. The process then ends.

D. Migrating a Container VM from a Source Host to a Destination Host

Figure 14:
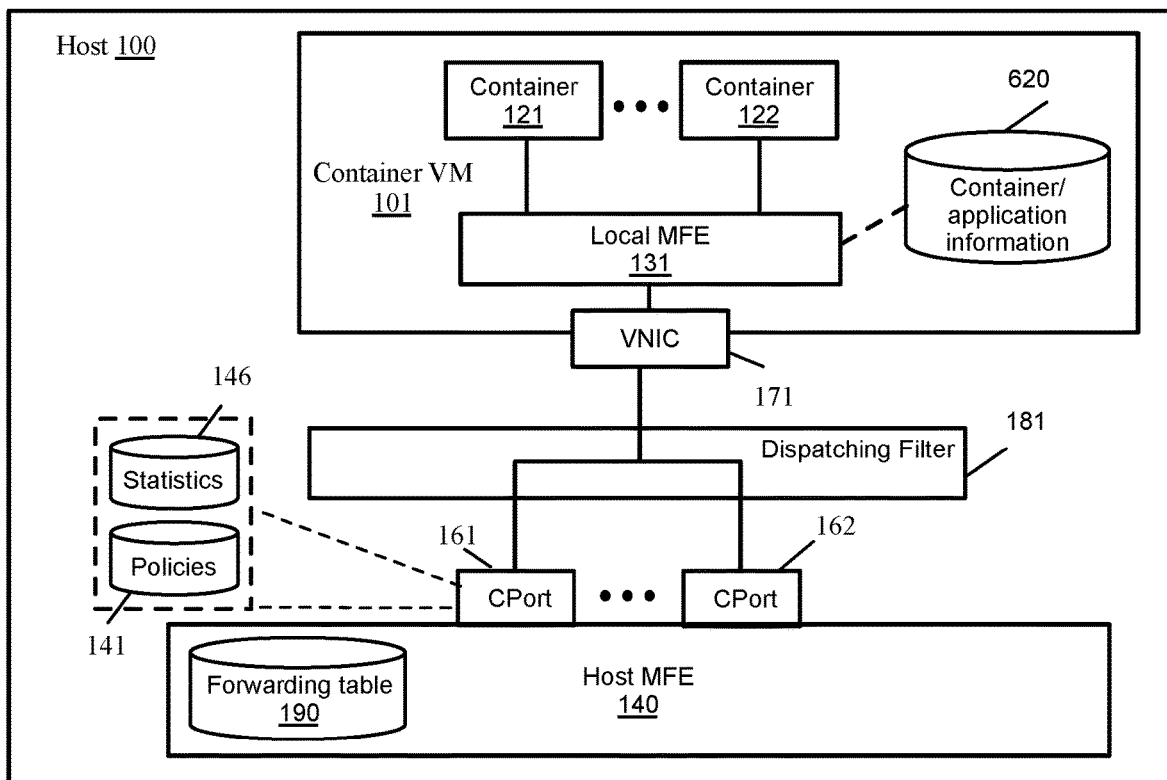
FIG. 14 conceptually illustrates operations performed to migrate a container VM from a source host to a destination host in some embodiments.
Figure 14:
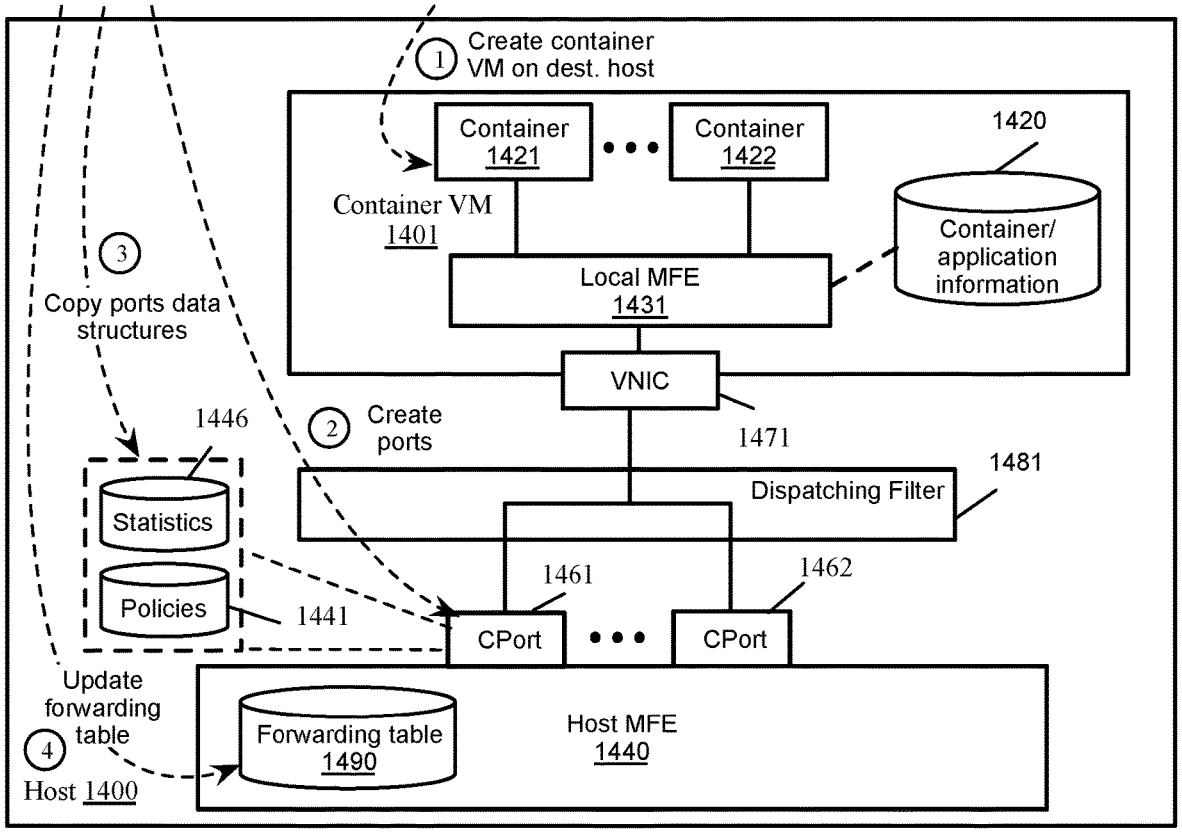

FIG. 14 conceptually illustrates operations performed to migrate a container VM from a source host to a destination host in some embodiments. As shown, the container VM 101 in the source host 100 includes several containers 121-122. Each container is associated with a port 161=162 on the host MFE 140 of the source host 100.

When the container VM is migrated from host 100 to host 1400, a migration controller 1405 controls (for instance either directly or in conjunction with container and application controller 210) the creation of the container VM in the destination host 1400. For simplicity, the figure conceptually illustrates step 1 (the creation of the container or application) is performed by container and application controller 210, while steps 2 to 4 are performed by the migration controller 1405.

As shown in step 1, a container VM 1401 is created in host 1400 that corresponds to container VM 101 in host 100. In step 2, the corresponding ports 1461-1462 are created on the host MFE 1440 of the host 1400. In step 3, the port data structures 141 and 146 are copied into data structures 1441 and 1446, respectively. As such, the policies, statistics, and the current state of each port (e.g., the firewall flow state) are copied from host 100 to host 1400. The forwarding table 1490 of the host MFE 1440 is also updated to include an entry for each new port 1461-1462.

II. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
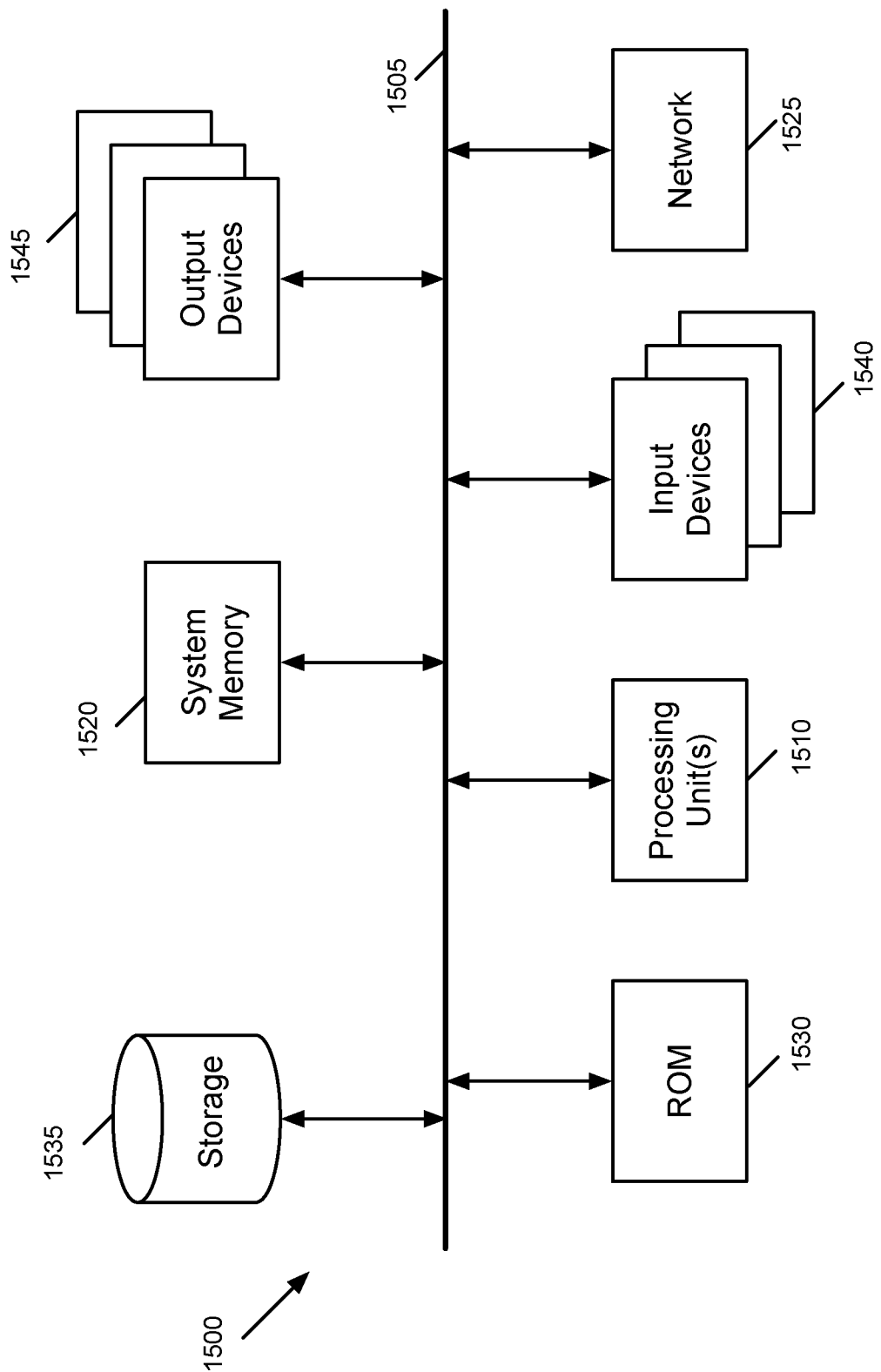
FIG. 15 conceptually illustrates an electronic system with which some embodiments of the invention are implemented.

FIG. 15 conceptually illustrates an electronic system 1500 with which some embodiments of the invention are implemented. The electronic system 1500 can be used to execute any of the control, virtualization, or operating system applications described above. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1520, a read-only memory (ROM) 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1520, and the permanent storage device 1535.

From these various memory units, the processing unit(s) 1510 retrieve instructions to execute and data to process in order to execute the processes of the invention. The processing unit(s) may be a single processor or a multi-core processor in different embodiments.

The read-only-memory 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1520 is a read-and-write memory device. However, unlike storage device 1535, the system memory is a volatile read-and-write memory, such as random access memory. The system memory stores some of the instructions and data that the processor needs at runtime. In some embodiments, the invention's processes are stored in the system memory 1520, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 4-5, 7-9, and 11-13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of processing data messages on a host computer, the host computer executing a virtual machine (VM) and a managed forwarding element (MFE) having a plurality of container-associated ports, the MFE configured to exchange data messages with a set of containers operating on the VM, the VM comprising a virtual network interface card (VNIC), the method comprising:
    receiving a data message from a particular container-associated port of the plurality of container-associated ports on the MFE, the particular container-associated port associated with a particular container of the set of containers;
    based on the particular container-associated port, tagging the data message with an identifier associated with the particular container; and
    forwarding the tagged data message to the VNIC to identify the particular container based on the identifier and to forward the data message to the particular container without the identifier,
    wherein each port of the plurality of container-associated ports is associated with only one container of the set of containers.

2. The method of claim 1, wherein the method is performed by a dispatching filter that also executes on the host computer along with the VM and the MFE.

3. The method of claim 1, wherein tagging the data message with the identifier comprises searching a mapping table that maps identifiers to corresponding container-associated ports on the MFE.

4. The method of claim 1, wherein a set of attributes associated with the data message comprises a set of headers, wherein the MFE selected the port based on a media access control (MAC) address in the set of headers.

5. The method of claim 1, wherein the MFE applies a set of polices associated with the particular port to the data message.

6. The method of claim 5, wherein a set of policies comprises one or more of quality of service (QoS), access control lists (ACL), firewall, Internet protocol flow information export (IPFix), mirroring, spoof guard, and routing.

7. The method of claim 1, wherein the identifier associated with the particular container identifies an application operating in the particular container.

8. The method of claim 1, wherein the MFE selects the port based on at least one of a destination virtual local area network identification (VLAN ID) and destination Virtual eXtensible LAN network identification (VXLAN VNI) associated with the data message.

9. The method of claim 1, wherein the identifier comprises a virtual local area network identifier (VLAN ID) that uniquely identifies the particular container.

10. A non-transitory machine readable medium storing a program for processing data messages on a host computer executing a virtual machine (VM) and a managed forwarding element (MFE) having a plurality of container-associated ports, the MFE configured to exchange data messages with a set of containers operating on the VM, the VM comprising a virtual network interface card (VNIC), the program for execution by at least one processing unit and comprising sets of instructions for:
    receiving a data message from a particular container-associated port of the plurality of container-associated ports on the MFE, the particular container-associated port associated with a particular container of the set of containers;
    based on the particular container-associated port, tagging the data message with an identifier associated with the particular container; and forwarding the tagged data message to the VNIC to identify the particular container based on the identifier and to forward the data message to the particular container without the identifier, wherein each port of the plurality of container-associated ports is associated with only one container of the set of containers.

11. The non-transitory machine readable medium of claim 10, wherein the program is a dispatching filter.

12. The non-transitory machine readable medium of claim 10, wherein the set of instructions for tagging the data message with the identifier comprises a set of instructions for searching a mapping table that maps identifiers to corresponding container-associated ports on the MFE.

13. The non-transitory machine readable medium of claim 10, wherein a set of attributes associated with the data message comprises a set of headers, wherein the MFE selected the port based on a media access control (MAC) address in the set of headers.

14. The non-transitory machine readable medium of claim 11, wherein the MFE applies a set of polices associated with the particular port to the data message.

15. The non-transitory machine readable medium of claim 14, wherein a set of policies comprises one or more of quality of service (QoS), access control lists (ACL), firewall, Internet protocol flow information export (IPFix), mirroring, spoof guard, and routing.

16. The non-transitory machine readable medium of claim 10, wherein the identifier associated with the particular container identifies an application operating in the particular container.

17. The non-transitory machine readable medium of claim 10, wherein the MFE selects the port based on at least one of a destination virtual local area network identification (VLAN ID) and destination Virtual eXtensible LAN network identification (VXLAN VNI) associated with the data message.

18. The non-transitory machine readable medium of claim 10, wherein the identifier comprises a virtual local area network identifier (VLAN ID) that uniquely identifies the particular container.

* * * * *